T. G. PERKINS.
BATTER MIXER.
APPLICATION FILED MAR. 6, 1913.
1,099,466.
Patented June 9, 1914.
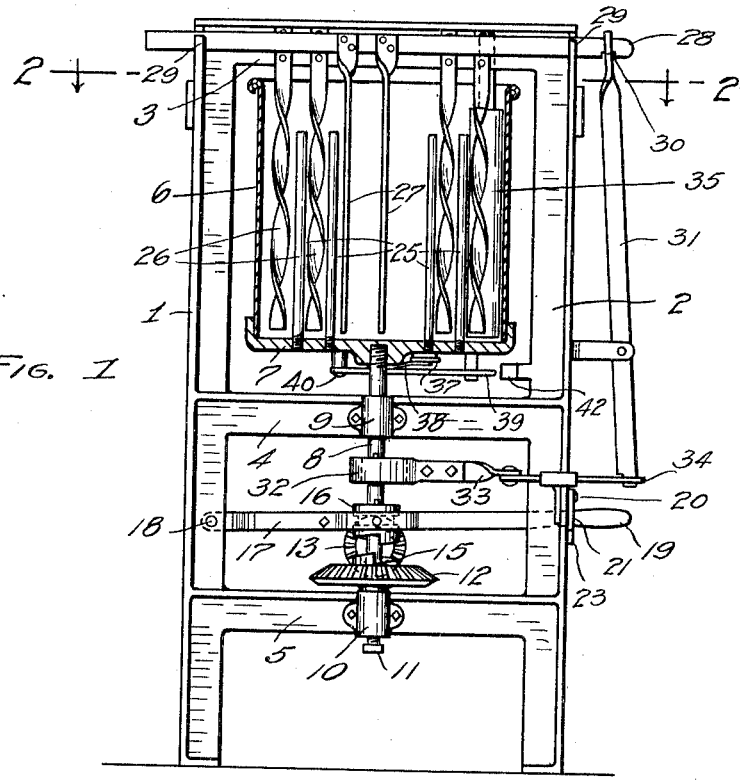
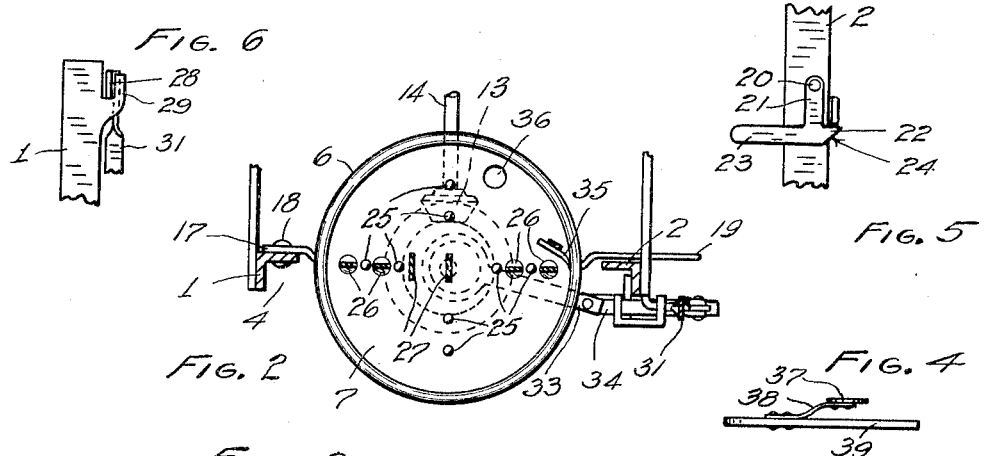
WITNESSES:
E. Peterson
F. C. Matheny
INVENTOR
Thomas G. Perkins
BY
Pierre Barnes
ATTORNEY

UNITED STATES PATENT OFFICE.

THOMAS G. PERKINS, OF SEATTLE, WASHINGTON.

BATTER-MIXER.

1,099,466.   Specification of Letters Patent.   Patented June 9, 1914.

Application filed March 6, 1913.   Serial No. 752,291.

*To all whom it may concern:*

Be it known that I, THOMAS G. PERKINS, a citizen of the United States, residing at Seattle, in the county of King and State of Washington, have invented certain new and useful Improvements in Batter-Mixers, of which the following is a specification.

This invention relates to culinary devices, and particularly to apparatus which is employed for stirring or mixing batter such as used in the manufacture of ice cream cones, waffles, etc.

The object of the invention is the perfecting of such apparatus whereby the operations thereof may be more readily and efficiently performed than hitherto.

With these ends in view, the invention consists in the novel construction and combination of parts, as will be hereinafter described and claimed.

In the accompanying drawings, Figure 1 is a vertical transverse sectional view of a batter mixer embodying the present invention. Fig. 2 is a sectional view taken through 2—2 of Fig. 1. Fig. 3 is an underside fragmentary view of the batter-containing vessel to illustrate the discharge valve therefor. Fig. 4 is a front elevation of the valve and certain associated parts shown detached. Figs. 5 and 6 are fragmentary elevational views of structural details.

The reference numerals 1 and 2 designate post members of a suitable frame provided with a transversely arranged tie-member 3 at the top, and with similarly disposed horizontal members 4 and 5 intermediate the height of and extending between said post members.

6 represents the peripheral wall of a cylindrical vessel or tank which is open at the top, but is provided with a bottom 7. Said vessel is secured to the upper end of an upright shaft 8 which is disposed medially of the frame-posts and axially with respect to the vessel. Journal boxes 9 and 10 are provided for said shaft on the frame members 4 and 5. The box 10 at the lower end of the shaft is, by preference, in the nature of a step-box having an adjustment screw 11. Rotatable upon said shaft is a bevel toothed gear wheel 12 which is driven by a toothed pinion 13 upon a power shaft 14. Integral with the gear wheel 12 is a clutch element 15 adapted to be engaged by a clutch element 16 which is splined to the shaft 8 so as to be capable of transmitting rotary motion thereto when the clutch element 16 is coupled with the complementary element 15.

For controlling the element 16, I provide a shifting lever 17 which is connected by a pivotal pin 18 to the frame post 1 and terminates in a handle end 19 which protrudes beyond the outer side of the other post 2. Pivotally connected by a pin 20 to the last named post is a catch (Fig. 5) for supporting the lever from its free end when the same is raised to disengage the clutch element 16. Said catch comprises an arm 21 depending from the pin 20. Extending at opposite sides of the arm are fingers 22 and 23. The finger 22 which affords the support proper for the lever is formed with a sloping outer face 24 serving, when encountered by the lever in the upward movement thereof, to swing the catch to one side for the passage of the lever. After the lever has been raised above the finger 22, the weight of the catch asserts itself to swing the referred to finger below the lever to receive the same on its upper surface. The function of the other finger, 23, is to provide means which may be conveniently controlled by the operator's foot when kicking the catch from beneath the lever, whereupon the weight of the lever plus that of the clutch element 16 attached thereto cause them to fall and engage the clutch.

Rigidly secured to the vessel bottom are upright rods 25 disposed desirably in pairs which are arranged radially of the axis of the vessel, as shown in Fig. 2.

26 represent rods or blades secured to and extending downwardly from the frame member 3 to within a short distance from the bottom of the vessel. The blades 26 are desirably made of relatively thin bars which are twisted to furnish a greater amount of agitation to the batter mixture than would otherwise be true and yet furnish surfaces which may be readily cleaned.

Extending downwardly into the vessel and within the orbit of the rods 25 are movable rods or blades 27 which are carried by a horizontal bar 28 arranged to reciprocate transversely of the machine in guides, such as 29, provided on the frame. Said guides are open at the top as shown in Fig. 6, whereby the bar and the blades 27 may be removed as a single piece from the machine.

Near an end of the bar 28 is a notch 30 for engaging the bar with a vibratory lever 31 through which reciprocatory motion is transmitted from an eccentric 32 mounted upon shaft 8 and through the agency of an eccentric rod 33 and a connected rod 34 passing through a guide provided on the frame. 35 represents a deflector depending from frame member 3 into the vessel. This deflector consists in a blade disposed, as illustrated in Fig. 2, at an angle from a plane extending diametrically through the vessel and has one of its side edges in proximity to the inner peripheral surface of the vessel. The function of the deflector is to cause the batter to flow toward the middle of the vessel after traveling outwardly under the influence of centrifugal force ensuing while the vessel is rotating.

36 represents an outlet hole provided in the bottom 7 of the vessel and adjacent to the circumference thereof.

37 is a gate-valve for closing the hole 36 and is supported upon an end of a resilient tongue, or leaf spring 38, which has its other end secured to an arm 39. The latter is pivotally connected by a pin 40 to the vessel bottom at the side of the hole toward which the same revolves, as indicated by arrow in Fig. 3. The valve may be manually closed by being swung inwardly or toward the axis of the vessel by means of a handle 41 provided at the free end of the arm. Should the operator, however, neglect to thus close the valve before charging the vessel with the batter ingredients, the vessel in rotating impinges the valve 37 or the arm 39 against a projection 42, Fig. 1, to thereby swerve them inwardly and accordingly close the valve.

In operation, the clutch element 16 is engaged with the other element 15 resulting in the shaft 8 and the mixing vessel being driven at a suitable speed derived from the power shaft 14. The batter ingredients are then supplied to the vessel and are rotated therewith with a tendency to flow outwardly from the axis of movement through the exercise of centrifugal forces acting thereon. This outward movement is counteracted by the deflector blade 35 which serves to direct the batter inwardly. Meanwhile, the batter is swept around by the revolving rods 25 which coact with the fixed rods 26 and the movable blades 27 to thoroughly mix the batter into a homogeneous semi-liquid mass. When the batter is thus mixed, the shaft 8 is uncoupled from the driving gear 12 resulting in the stoppage of the vessel from which the batter is withdrawn through the outlet 36.

What I claim, is—

1. In apparatus of the class described, the combination with the frame, an upright shaft mounted for rotation thereon, releasable means for rotating the shaft, and a vessel secured to the shaft to rotate therewith, of upright stirring rods provided within the vessel and movable therewith, stirring rods depending from the frame and coacting with the aforesaid rods, a bar slidably connected to the frame, operative connection between the bar and said shaft for reciprocating the bar, and stirring rods depending from the bar into the vessel and movable in unison with the bar.

2. In apparatus of the class described, the combination with the frame, an upright shaft mounted for rotation thereon, releasable means for rotating the shaft, and a vessel secured to the shaft to rotate therewith and provided with a discharge opening in its bottom, a valve for said opening, an arm pivotally connected with the vessel and carrying the valve, and a spring element interposed between said arm and the valve.

3. In apparatus of the class described, the combination with the frame, an upright shaft mounted for rotation thereon, releasable means for rotating the shaft, and a vessel secured to the shaft to rotate therewith and provided with a discharge opening in its bottom, of a valve for said opening, an arm pivotally connected with the vessel and carrying the valve, and means provided on the frame and engageable with said arm to influence the same for closing the valve.

Signed at Seattle, Wash., this 21st day of February, 1913.

THOMAS G. PERKINS.

Witnesses:
E. PETERSON,
HORACE BARNES.